(12) United States Patent
Choe (10) Patent No.: US 11,654,734 B2
(45) Date of Patent: *May 23, 2023

(54) ACTUATOR COUPLER FOR HITCH CONNECTION

(71) Applicant: KOREA WHEEL CORPORATION, Boryeong-si (KR)

(72) Inventor: Hun Choe, Boryeong-si (KR)

(73) Assignee: KOREA WHEEL CORPORATION, Boryeong-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,391

(22) Filed: Jun. 20, 2022

(65) Prior Publication Data

US 2022/0324275 A1  Oct. 13, 2022

Related U.S. Application Data

(63) Continuation of application No. 17/132,593, filed on Dec. 23, 2020, now Pat. No. 11,364,753.

(51) Int. Cl.
*B60D 1/06* (2006.01)

(52) U.S. Cl.
CPC ............... *B60D 1/065* (2013.01); *B60D 1/06* (2013.01)

(58) Field of Classification Search
CPC ...................................................... B60D 1/065
See application file for complete search history.

(56) References Cited

U.S. PATENT DOCUMENTS

| | | | |
|---|---|---|---|
| 2,090,113 A | 8/1937 | Dayton |
| 2,113,338 A | 4/1938 | Wohldorf |
| 2,143,322 A | 1/1939 | Knobel, Jr. |
| 2,166,208 A | 7/1939 | Dayton |
| 2,178,094 A | 10/1939 | Berluti |
| 2,219,955 A | 10/1940 | Gilmore |
| 2,363,755 A | 11/1944 | Smith |
| 2,377,368 A | 6/1945 | Polstra |
| 2,439,967 A | 4/1949 | Dollase |

(Continued)

FOREIGN PATENT DOCUMENTS

| | | |
|---|---|---|
| DE | 3034137 A1 | 3/1982 |
| DE | 3034137 A1 | 4/1986 |

(Continued)

*Primary Examiner* — Kevin Hurley
(74) *Attorney, Agent, or Firm* — R. Reams Goodloe, Jr.

(57) ABSTRACT

A coupler for connecting a trailer to a ball hitch. The coupler has a body that provides a cavity for a downwardly facing ball hitch receiver. Spaced apart first and second sidewalls have therein first, second, and third apertures, and the first, second and third apertures in the first sidewall are aligned with the first, second, and third apertures in the second sidewall. A latch handle having a base with ear portions having downwardly facing surfaces is pivotally connected to the body using a pivot shaft pin. The body includes a latch slot, in which a spring biased ball latch, sized and shaped for engagement with a ball hitch is connected to the latch handle by a latch bar. A safety pin is provided, which can be inserted through the third apertures in each of the first and second sidewalls. When inserted, the latch handle is secured in an uplock condition, so that downward closing motion of the latch handle is arrested by the downward facing surfaces at the ear portions of the latch handle. Alternately, the safety pin can be used to secure the latch handle in a downlock, closed condition.

18 Claims, 9 Drawing Sheets

(56) References Cited

U.S. PATENT DOCUMENTS

| | | |
|---|---|---|
| 2,523,500 A | 9/1950 | Davey et al. |
| 2,726,099 A | 12/1955 | Nunn, Jr. |
| 2,732,222 A | 1/1956 | Harroun |
| 2,732,224 A | 1/1956 | Deebel |
| 2,823,931 A | 2/1958 | Schrader |
| 2,542,643 A | 2/1959 | Duncan |
| 3,074,356 A | 1/1963 | Parker et al. |
| 3,139,291 A | 6/1964 | Geresy |
| 3,237,969 A | 3/1966 | Geresy |
| 3,595,527 A | 7/1971 | Douglass |
| 3,724,875 A | 4/1973 | Hillman |
| 3,759,549 A | 9/1973 | Morris |
| 3,794,356 A | 2/1974 | Hollis, Jr. |
| 3,830,580 A | 8/1974 | Slattery et al. |
| 3,841,663 A | 10/1974 | Proffit |
| 3,851,855 A | 12/1974 | Douglass |
| 3,863,894 A | 2/1975 | Mansi et al. |
| 3,873,131 A | 3/1975 | Adams |
| 3,888,517 A | 6/1975 | Ray |
| 3,921,958 A | 11/1975 | Brockelsby et al. |
| 3,944,259 A | 3/1976 | Miller |
| 3,997,191 A | 12/1976 | Morgan |
| 4,017,977 A | 4/1977 | Light et al. |
| 4,169,579 A | 10/1979 | Moll |
| 4,225,261 A | 9/1980 | Marx |
| 4,283,073 A | 8/1981 | Gostomski et al. |
| 4,352,505 A | 10/1982 | Chambers |
| 4,527,925 A | 7/1985 | Bauer et al. |
| 4,598,812 A | 7/1986 | Grube |
| 4,623,125 A | 11/1986 | Ebey |
| 4,718,690 A | 1/1988 | Baker |
| 4,763,917 A | 8/1988 | Chambers |
| D298,676 S | 11/1988 | Chambers |
| 4,802,686 A | 2/1989 | Isreal |
| 4,817,979 A | 4/1989 | Goettker |
| D304,818 S | 11/1989 | Chambers |
| 4,889,357 A | 12/1989 | Perry |
| 5,009,445 A | 4/1991 | Williams, Jr. |
| 5,011,119 A | 4/1991 | Harrington |
| 5,067,692 A | 11/1991 | Nudd et al. |
| 5,072,964 A | 12/1991 | Schule |
| 5,282,605 A | 2/1994 | Sauber |
| 5,344,174 A | 9/1994 | Sanders |
| 5,435,523 A | 7/1995 | Hying et al. |
| 5,582,420 A | 12/1996 | Ulbrich |
| 5,632,501 A | 5/1997 | Jackson et al. |
| 5,887,885 A | 3/1999 | Byers et al. |
| 6,000,710 A | 12/1999 | Schocker et al. |
| 6,302,381 B1 | 10/2001 | Roll |
| 6,481,738 B1 | 11/2002 | Duncan et al. |
| 6,505,849 B1 | 1/2003 | Ebey |
| 6,581,952 B1 | 6/2003 | Mackarvich |
| 6,588,790 B2 | 7/2003 | Hall |
| 6,811,176 B2 | 11/2004 | Brown et al. |
| 6,869,095 B2 | 3/2005 | Roll |
| 6,904,926 B2 | 6/2005 | Aylward et al. |
| 6,910,425 B2 | 6/2005 | Galpin |
| 7,007,967 B2 | 3/2006 | Goettker |
| 7,461,856 B2 | 12/2008 | Goettker |
| 7,690,673 B1 | 4/2010 | Kraai |
| 7,722,073 B2 | 5/2010 | Goettker |
| 7,878,526 B1 | 2/2011 | Jantzen |
| 8,276,933 B2 | 10/2012 | Goettker |
| 2002/0003341 A1 | 1/2002 | Hall |
| 2004/0050429 A1 | 3/2004 | Aylward et al. |
| 2004/0135345 A1 | 7/2004 | Roll et al. |
| 2005/0225054 A1 | 10/2005 | Budge |
| 2008/0023941 A1 | 1/2008 | Suhling |
| 2009/0033062 A1 | 2/2009 | Goettker |
| 2009/0115166 A1 | 5/2009 | Goettker |
| 2011/0121540 A1 | 5/2011 | Graber |
| 2014/0015226 A1 | 1/2014 | Mackarvich |
| 2015/0352917 A1 | 12/2015 | Volin |

FOREIGN PATENT DOCUMENTS

| | | |
|---|---|---|
| DE | 4413985 C1 | 9/1995 |
| DE | 10306512 A1 | 9/2004 |
| EP | 2700516 A2 | 2/2014 |
| EP | 2700516 B1 | 3/2018 |
| ES | 1058285 U | 11/2004 |
| FR | 2378644 | 8/1978 |
| GB | 406491 A | 3/1934 |
| GB | 410095 A | 5/1934 |
| GB | 459394 A | 1/1937 |
| GB | 460462 A | 1/1937 |
| GB | 1352025 A | 5/1974 |
| KR | 100835599 B1 | 6/2008 |
| RU | 2703855 C1 | 10/2019 |
| WO | WO 2020/081681 A1 | 4/2020 |

ACTUATOR COUPLER FOR HITCH CONNECTION

RELATED PATENT APPLICATIONS

This application is a continuation of U.S. patent application Ser. No. 17/132,593, filed Dec. 23, 2020, which will mature into U.S. Pat. No. 11,364,753, on Jun. 21, 2022, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to couplers, also known as hitch receivers, for joining a trailer to a ball hitch for pulling a trailer.

BACKGROUND

Couplers for detachably joining a trailer to a ball hitch are well known and widely used. Various types of actuator couplers utilize latch handles which generally move up for disengagement with the hitch, and down for engagement with the hitch. Often, the acts of connecting or disconnecting a trailer via the actuator coupler occur in situations where either the vehicle or the trailer, or support for the trailer tongue, may not be entirely stable. Or movement of either the towing vehicle or the trailer may cause the internal mechanisms of the actuator coupler to unexpectedly move the latch handle from an upward, open position, toward a downward, closed position. If a user's finger or fingers, or hand, is in the wrong spot, injury may occur from pinching by the latch handle, as it attempts to close. Thus, a continuing need exists for improvements in actuator coupler designs for use in a variety of towed vehicle combinations. Ease of use and safety of use would be facilitated by availability of an actuator coupler device which includes an apparatus for safely securing a latch handle in an upward, hitch disconnecting position, and by a method of using such apparatus during connection and disconnection of an actuator coupler to a hitch.

Many known trailer coupler designs have been provided in which a latch handle can be locked in a latched configuration, so that the latch apparatus cannot be manually or accidentally unlatched without prior removal of a locking pin. For example, a design provided by in U.S. Pat. No. 7,722,073 B2, issued to Bernardt GOETTKER on May 25, 2010, entitled TRAILER COUPLER, provides a trailer coupler having a latch which uses a locking pin to maintain the latch in a locked, trailer connected configuration. However, the mechanism disclosed therein does not include a pivot shaft to anchor the latch bar to the case, and thus, the connection of the latch handle to the coupler case is unstable. And, while the patent discloses use of a downlock, it does not use an uplock mechanism for safety of the user.

Consequently, there remains a continuing and unmet need for an actuator coupler for use in attaching a trailer to a vehicle which provides an uplock to enhance the safety of a user, and in which a latch handle may be safely secured in an upward and locked position. It would be advantageous in towed vehicles that the coupling apparatus, including a lock housing design, and locking pin, when including an uplock, is easily configured for use in either the uplock or a downlock position. It would also be advantageous if the actuator coupler included a pivot connection between the latch handle and the coupler case, so that the apparatus has improved stability, and thus is less likely to move in unexpected ways, compared to prior art. It would be particularly advantageous if such an uplock apparatus allowed for a simple, easily practiced method of use, and that it be configured for installation and when use, when desired, by a single adult without resort to tools or lifting devices.

SOME OBJECTS, ADVANTAGES, AND NOVEL FEATURES

An objective of the invention(s) disclosed herein is to provide a design for an actuator coupler for attachment of a trailer to a hitch, in which it is easy for a user to install and remove the uplock, without the necessity of use of lifting devices or tools of various sorts.

Another objective of the invention(s) disclosed herein is to provide a design for an actuator coupler in which a locking pin is usable as both an uplock and as a downlock pin.

Another important objective is to provide a quickly removable detachable locking pin in an actuator coupler which is easily and rapidly adjustable from a downlock position to an uplock position.

Another important objective is to provide an actuator coupler in which the latch handle moves in a stable, more predictable fashion, via use of a latch pivot pin.

Yet another important objective is to provide an actuator coupler design which improve safety of the user, by securely locking the latch handle in an upward, unlocked position, while manipulating a vehicle ball hitch to a suitable position adjacent the receiver in the actuator coupler.

Finally, another important objective is to provide an improved actuator coupler which may be easily and quickly installed in existing or new vehicles, and which improves safety of use for persons attaching and detaching trailers from ball hitches.

SUMMARY

I have now invented an improved actuator coupler for connecting a trailer to a towing vehicle using a ball hitch. Importantly, the actuator coupler provides for improved user safety when connecting or disconnecting the actuator coupler located on a trailer being towed, to a ball hitch on a towing vehicle. This is important since it dramatically decreases the chance that inadvertent movement of parts, such as a latch handle, will pinch or otherwise damage fingers or other body parts of a user. Moreover, the design provides a method for the quick yet safe connection and disconnection between an actuator coupler and a ball hitch.

In various embodiments, an actuator coupler may include a number of components. First, a coupler case is provided, which has a body, with a front and a rear. A ball hitch receiver is located within the body. The ball hitch receiver includes a downwardly oriented partially spherical surface portion complementary in size to a selected ball hitch, for receiving a selected ball hitch therein. The body also includes spaced apart first and second sidewalls. The first and second sidewalls each have therein first, second, and third apertures, wherein each of the first, second, and third apertures are defined by first aperture sidewalls, second aperture sidewalls, and third aperture sidewalls, respectively. For use with a latch pivot shaft pin and a safety pin, the first and third apertures in the first sidewall are aligned with the first and third apertures in the second sidewall. Within the body, a latch slot is provided. The latch slot is defined between a front wall and a rear wall, and it also has an upper end wall.

A latch handle is provided. The latch handle includes a base and an actuator arm which extends forward from the base. The base has therein a plurality of transverse oriented apertures. The plurality of transverse oriented apertures include (a) a latch pivot shaft pin receiver, (b) a spring pin receiver, and (c) a safety pin receiver. The latch handle is pivotably coupled to the coupler case by the latch pivot shaft pin, inserted through the first aperture in the first sidewall, the latch pivot pin receiver in the base of the latch handle, and the first aperture in the second sidewall.

A latch assembly is provided, including a latch bar, a spring, a spring pin, a ball latch, and a latch bar pin. The latch bar is a thin, elongated plate used to connect the latch handle and the ball latch. The latch bar has therein a spring pin aperture, a latch bar pin aperture, and a safety pin aperture. The spring pin is located at the spring pin receiver, and pivotally connects the latch bar to the latch handle. The ball latch is shaped for complementary fit against and engagement with a lower portion of a selected ball hitch. A latch bar pin pivotally secures the ball latch to the latch bar. The spring may be a compression coil type spring, sized, shaped, and situated to surround a portion of the latch bar, and within the latch slot between the ball latch and the upper end wall of the latch slot, for urging the ball latch downward and away from the upper end wall of the latch slot.

The latch pivot shaft pin extends along a latch pivot shaft pin axis between a distal end and a proximal end, with an outside shaft diameter sized and shaped for insertion through the first apertures in each of the first and second sidewalls. In an embodiment, the latch pivot shaft pin may be provided, at or near the distal end, with an interference structure outwardly protruding for a distance larger than the outside shaft diameter sufficiently large that the interference structure cannot pass through the first aperture in the first end wall. For installation, the pivot shaft pin may be urged, proximal end first, through the first aperture in the first end wall, then through the latch pivot shaft pin receiver, and then through the first aperture in the second end wall, after which a detachable ring is affixed to the proximal end, so as to securely keep the latch pivot shaft pin in a working location. Thus, the first detachable ring is sufficiently large to keep the first detachable ring from passing through the first aperture in the second sidewall.

A safety pin is provided. The safety pin may be provided in the shape of a cylindrical pin extending along a safety pin axis between a distal end and a proximal end, and having an outside shaft diameter sized and shaped for insertion through the third apertures in each of the first and second sidewalls. Adjacent to the distal end of the safety pin, a spring loaded ball detent may be provided, wherein the spring loaded ball detent is sized and shaped for interference resistance against passage of the safety pin through the third aperture in the first sidewall. When in a closed, downlock position, the safety pin also is fitted though the safety pin receiver in the base of the latch handle as well as through apertures in the first and second sidewalls of the coupler case.

In an embodiment, the latch handle is provided with a base extending downward in an ear shaped configuration, ending at a downward facing surface. In an embodiment, the downward facing surface may further comprise a safety pin receiving notch. A novel feature provided herein is the use of the safety pin for securing the latch handle in an uplock position. In the uplock position, the safety pin is inserted through the third apertures in each of the first and second sidewalls, and consequently any downward motion of the latch handle about the latch pivot shaft pin is arrested by the downward facing surface of the base of the latch handle.

The actuator coupler described herein needs no tools, or extra or loose parts, bolts, or other components for on-site operation for attachment or detachment of a ball hitch to the actuator coupler. Resultantly, the actuator coupler apparatus disclosed herein is easy to use, since all necessary components are already on board and readily available. The device provides a significant improvement in safety during use, thus reducing the likelihood of injury during trailer connection or disconnection operations.

BRIEF DESCRIPTION OF THE DRAWING

The present invention(s) are fully described herein by way of exemplary embodiments, using for illustration the accompanying drawing in which like reference numerals denote like elements in the various figures of the drawing, and in which:

FIG. 6 is vertical cross-sectional view of an embodiment for an actuator coupler, similar to the view just shown in FIG. 5, now showing the latch handle in an upward, locked position, and with the safety pin inserted in an upward, locked position, showing the various components of the actuator coupler, including the coupler case, the latch handle, a latch pivot shaft pin, a ball hitch for connection with the receiver in the body of the coupler case, a ball latch, a latch bar which connects the latch handle to the ball latch, a spring, an upper spring pin which engages the latch handle and the latch bar, and a lower spring pin which engages the latch bar, and also a workpiece ball hitch to be installed in the actuator coupler; the components are shown with the latch handle in an upward, locked position, but without a ball hitch attached.

FIG. 7 is vertical cross-sectional view of an embodiment for an actuator coupler, similar to the view just shown in FIG. 6, but now showing a selected ball hitch fully positioned in the hitch receiving portion of the coupler case, and still showing the latch handle in an upward, locked position, and with the safety pin inserted in an upward, locked position, showing the various components of the actuator coupler, including the coupler case, the latch handle, a latch pivot shaft pin, a ball hitch for connection with the receiver in the body of the coupler case, a ball latch, a latch bar which connects the latch handle to the ball latch, a spring, an upper spring pin which engages the latch handle and the latch bar, and a lower spring pin which engages the latch bar, and also a workpiece ball hitch now located in the receiver of the actuator coupler; the components are shown with the latch handle in an upward, locked position, but with a ball hitch inserted, ready to be latched and securely connected.

FIG. 8 is vertical cross-sectional view of an embodiment for an actuator coupler, similar to the view just shown in FIG. 7, also showing a selected ball hitch fully positioned in the hitch receiving portion of the coupler case, but now showing the latch handle in an downward, locked position, and with the safety pin inserted in an downward, locked position with the ball hitch securely connected, and also showing the various components of the actuator coupler, including the coupler case, the latch handle, a latch pivot shaft pin, a ball hitch for connection with the receiver in the body of the coupler case, a ball latch, a latch bar which connects the latch handle to the ball latch, a spring, an upper spring pin which engages the latch handle and the latch bar, and a lower spring pin which engages the latch bar, and also a workpiece ball hitch now located in and securely retained therein by the ball hitch and the receiver of the actuator coupler; the components are shown with the latch handle in an downward, locked position with a ball hitch inserted, and the actuator coupler latched in a downward, locked position, with the ball hitch securely connected.

FIGS. 9A through 9H each provide a perspective view of a step in a method of connection of a ball hitch to the actuator coupler.

FIGS. 10A through 10H each provide a perspective view of a step in a method of disconnecting a ball hitch from the actuator coupler.

The foregoing figures, being merely exemplary, contain various elements that may be present or omitted from a final configuration for an embodiment of an actuator coupler for detachable but secure connection to a ball hitch. Other variations in an actuator coupler may use other mechanical structures, mechanical arrangements, or size and shape of components, and yet employ the principles described herein and as generally depicted in the drawing figures provided, and as more specifically called out in the claims set forth below. In particular, although various dimensions and comparative sizes may be utilized by those of skill in the art to make and use the claimed invention, and there is no intention to limit the claimed invention to any dimensional disclosed or suggested herein, any of which is exemplary rather than mandatory. Thus, actuator coupler components may be provided which are sized up or down from any dimensions depicted, without affecting the scope of the appended claims. An attempt has been made to draw the figures in a way that illustrates at least those elements that are significant for an understanding of exemplary uplock and downlock features provided by the actuator coupler depicted, and which may be used with various types of ball hitch systems.

It should be understood that the teachings hereof may be useful in different embodiments of various sizes and shapes of actuator couplers, depending upon the requirements for a given application, within the scope and coverage of the teachings herein as defined by the claims. Further, like features may be described using like reference numerals, or other like references, without further mention thereof.

DETAILED DESCRIPTION

Figure 1:
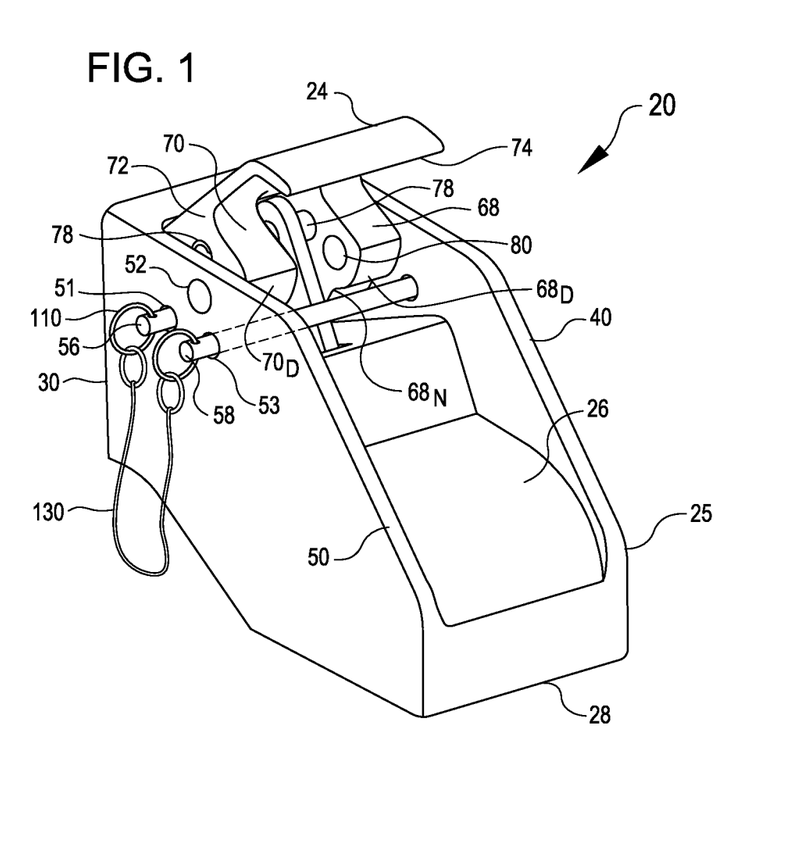
FIG. 1 is a perspective view of an embodiment for an actuator coupler for a ball hitch, with a pivot pin and pivoting latch handle, and showing the use of a safety pin in an uplock position and secured to the coupler case, to secure the latch handle in an upward, open, yet locked position, and also showing the use of a safety wire to prevent loss of the safety pin.

Attention is directed to FIG. 1, which provides a perspective view of an improved actuator coupler 20. The actuator coupler 20 as described herein provides for improved user safety when connecting or disconnecting the actuator coupler 20 located on a trailer (not shown) being towed to a ball hitch 22 (see FIG. 5) on a towing vehicle (not shown). The actuator coupler 20 design as described may dramatically decreases the chance that inadvertent movement of parts, such as a latch handle, will pinch or otherwise damage fingers or other body parts of a user. Moreover, as further described below in connection with FIGS. 9A-911, and FIGS. 10A-10H, and the design provides a method for the quick yet safe connection and disconnection between an actuator coupler 20 and a ball hitch 22.

Figure 5:
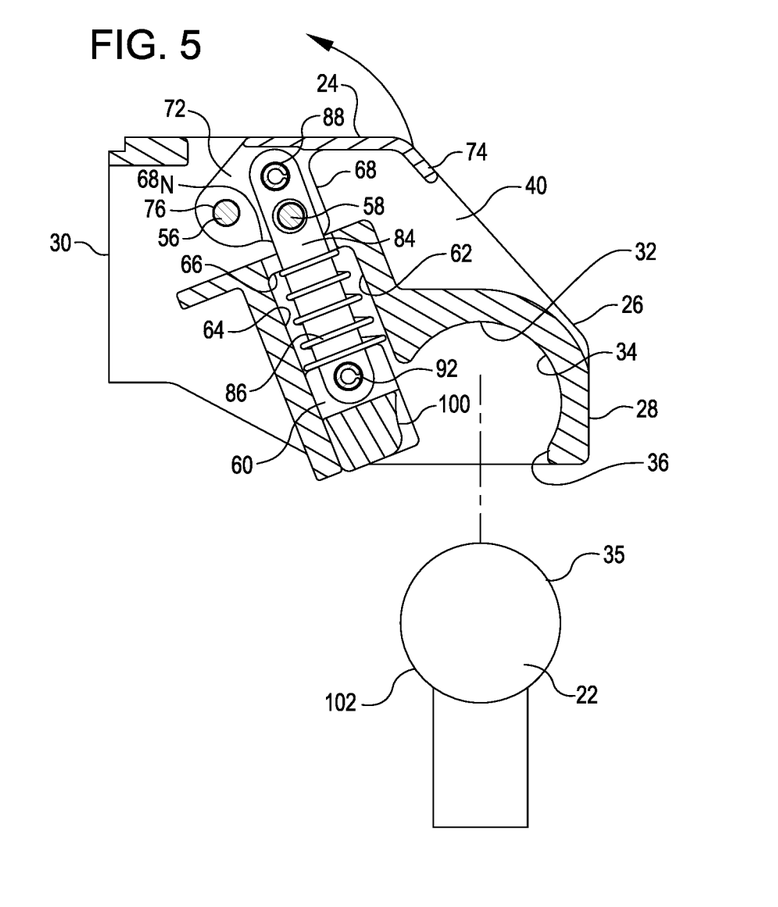
FIG. 5 is vertical cross-sectional view of an embodiment for an actuator coupler, showing the various components of the actuator coupler, including the coupler case, the latch handle, a latch pivot shaft pin, a safety pin, a ball latch, a latch bar which connects the latch handle to the ball latch, a spring, an upper spring pin which engages the latch handle and the latch bar, and a lower spring pin which engages the latch bar and a ball latch, and also a workpiece ball hitch to be installed in the actuator coupler; the components are shown with the latch handle in a downward, locked position, but without a ball hitch attached.
Figure 6:
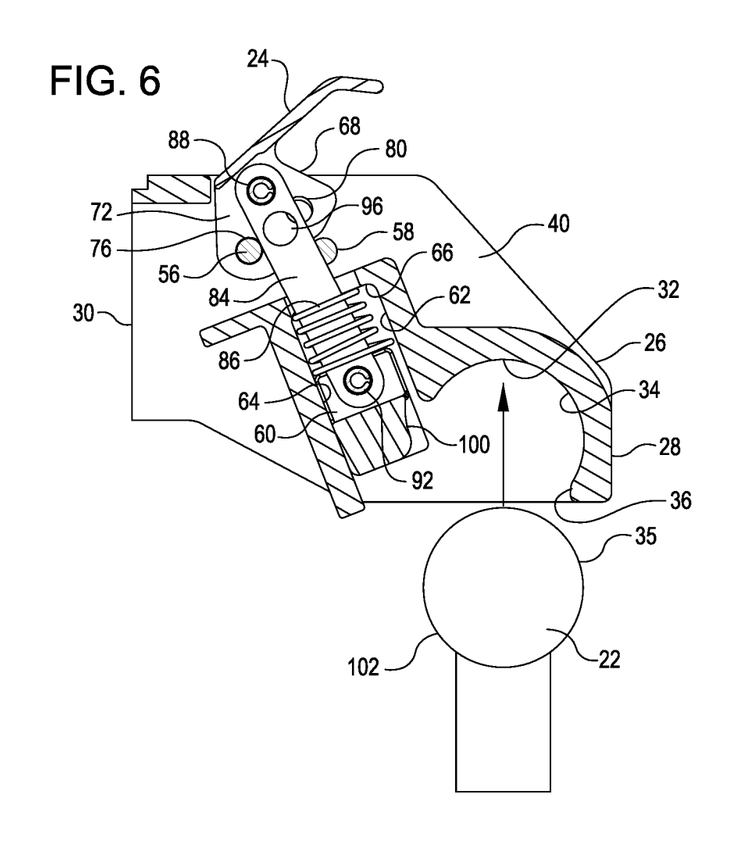
Figure 7:
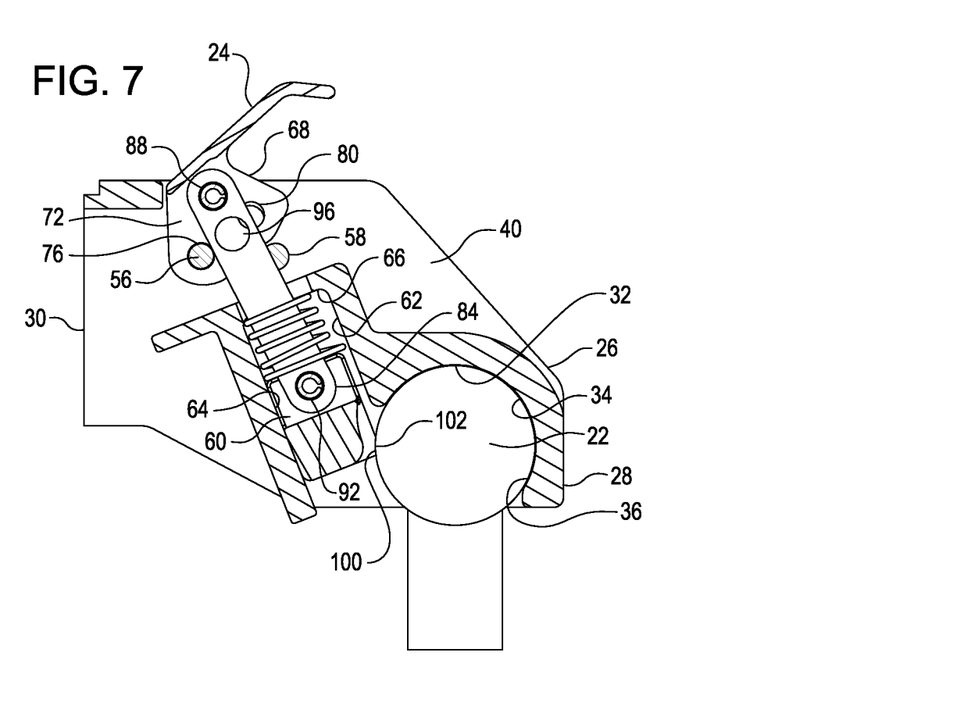
Figure 8:
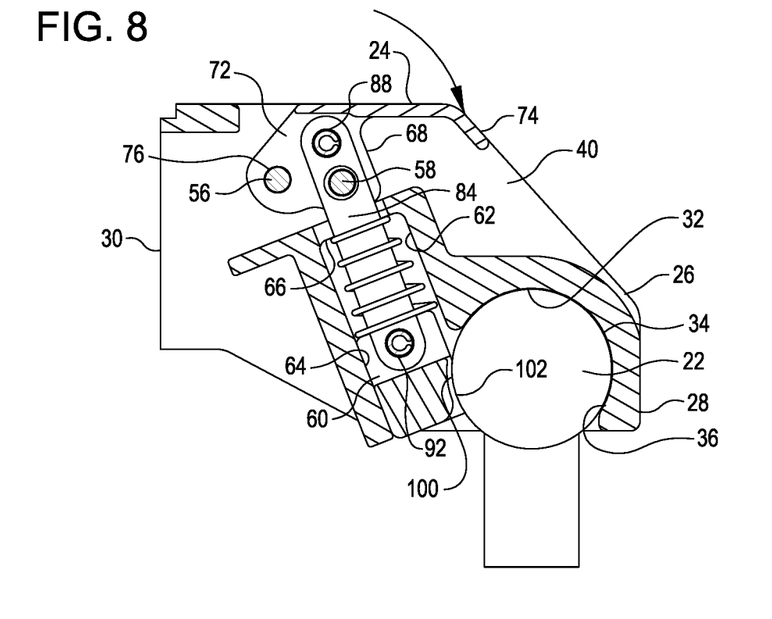
Figure 9A:
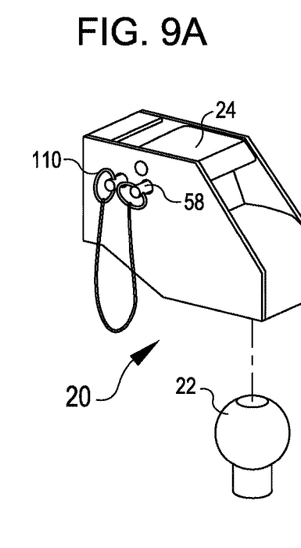
FIG. 9A shows an actuator coupler that is not connected to a ball hitch, but where the safety pin is used to secure the latch handle in a downward, locked position.
Figure 9B:
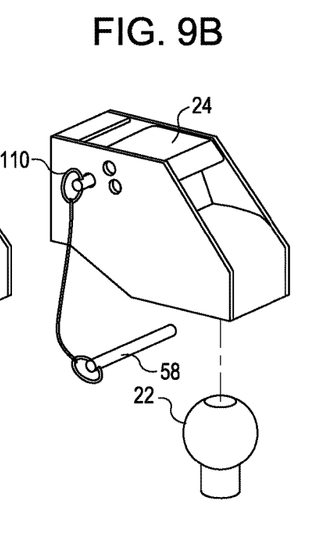
FIG. 9B shows an actuator coupler that is not connected to a ball hitch, but where the safety pin has been removed, to enable movement of the latch handle.
Figure 9C:
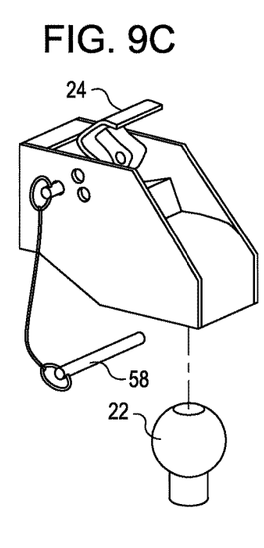
FIG. 9C shows an actuator coupler that is not connected to a ball hitch, but where the safety pin has been removed, and the latch handle has been moved to an upward, but as yet unlocked position.
Figure 9D:
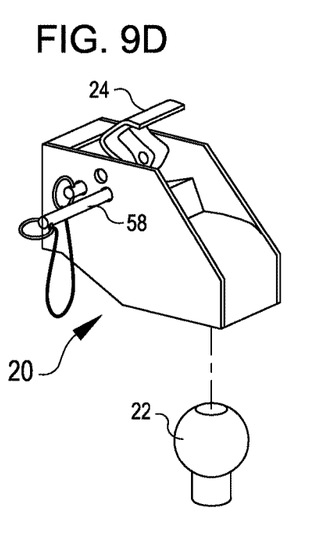
FIG. 9D shows an actuator coupler that is not connected to a ball hitch, but where the safety pin has just been partially inserted, on the way to full locking position while the latch handle is in an upward, but as yet not fully locked position.
Figure 9E:
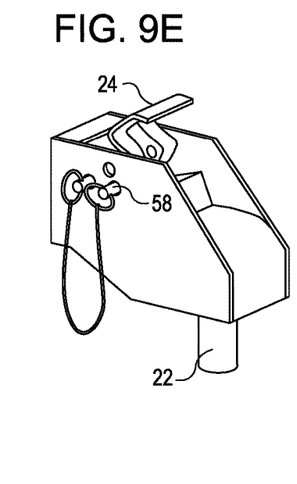
FIG. 9E shows an actuator coupler that is now positioned in working configuration with a ball hitch, but where the safety pin has been fully inserted, in a full locking position to keep the latch handle from moving downward and pinching fingers of a user, during installation of the ball hitch into the receiving portion of the actuator body.
Figure 9F:
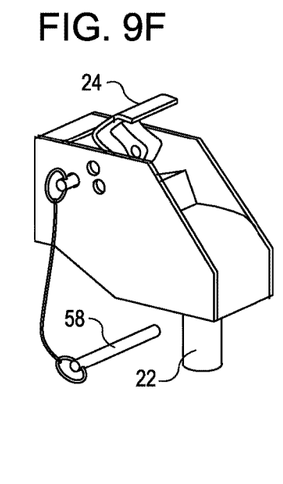
FIG. 9F shows an actuator coupler that is now positioned in working configuration with a ball hitch, and after the ball hitch is in a stable position, the safety pin has been fully removed, to a fully unlocked position to enable the latch handle to be moved downward to a fully locked position, securing the ball hitch in the actuator coupler.
Figure 9G:
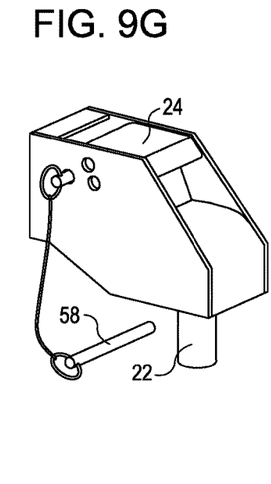
FIG. 9G shows an actuator coupler that is now positioned in working configuration with a ball hitch, and with ball hitch is in a stable position with the safety pin removed, and the latch handle has been moved to fully locked position, securing the ball hitch in the actuator coupler.
Figure 9H:
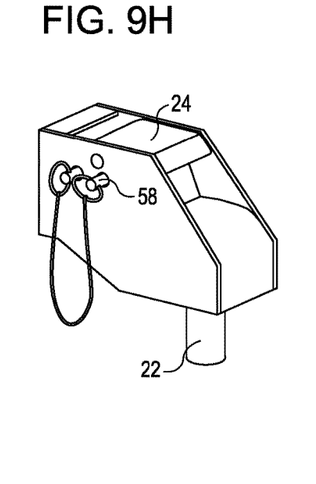
FIG. 9H shows an actuator coupler that is now positioned in working configuration with a ball hitch, and with ball hitch is in a stable position with the safety pin inserted with the latch in a downward position, so the latch handle is now in a downlock position, securing the ball hitch in the actuator coupler.
Figure 10A:
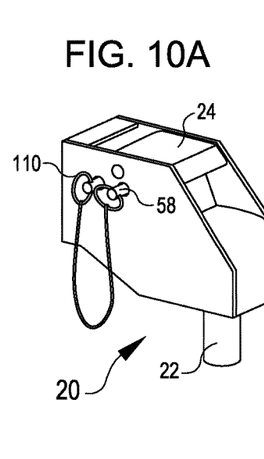
FIG. 10A shows an actuator coupler connected to a ball hitch, where the safety pin is being used to secure the latch handle in a downward, locked position, i.e. the actuator coupler is in a working, towing position.
Figure 10B:
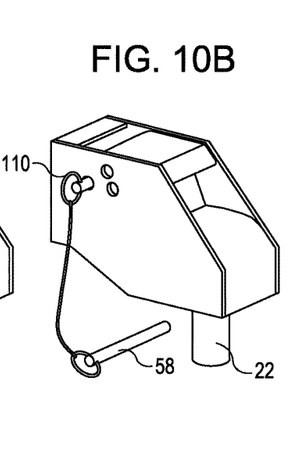
FIG. 10B shows an actuator coupler that is connected to a ball hitch, but where the safety pin has been removed, to enable movement of the latch handle upward, so that the ball hitch can be disconnected.
Figure 10C:
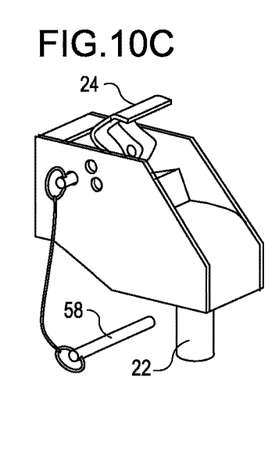
FIG. 10C shows an actuator coupler that is connected to a ball hitch, but where the safety pin has been removed, and the latch handle has been moved to an upward, and unlocked position, to enable removal of the ball hitch.
Figure 10D:
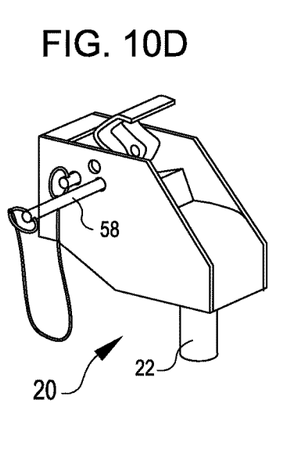
FIG. 10D shows an actuator coupler that is connected to a ball hitch, but where the safety pin has just been partially inserted, on the way to a fully inserted and locking position while the latch handle is in an upward, fully unlocked position.
Figure 10E:
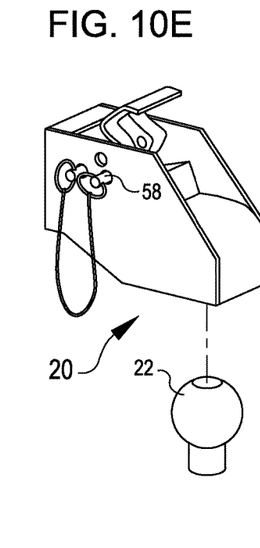
FIG. 10E shows an actuator coupler that is now positioned in working configuration for removal of a ball hitch, and where the safety pin has been fully inserted, in a full locking position to keep the latch handle from moving downward and pinching fingers of a user, during removal of the ball hitch from the receiving portion of the actuator body.
Figure 10F:
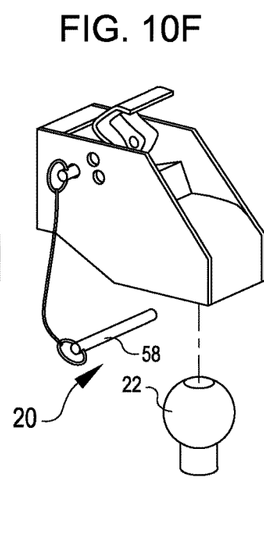
FIG. 10F shows an actuator coupler that is now positioned in working configuration and with the ball hitch removed, and with the safety pin fully removed, to a fully unlocked position to enable the latch handle to be moved downward to a fully locked position.
Figure 10G:
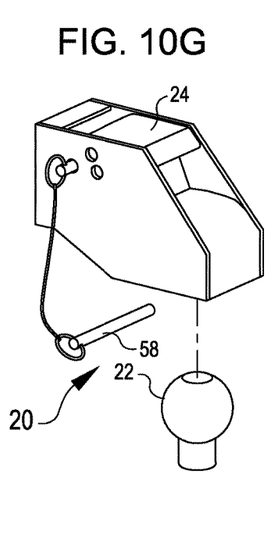
FIG. 10G shows an actuator coupler that is now positioned in storage configuration without connection to a ball hitch, and with the latch handle in a downward, stable position with the safety pin removed, and where the latch handle is in position to receive insertion of a safety pin.
Figure 10H:
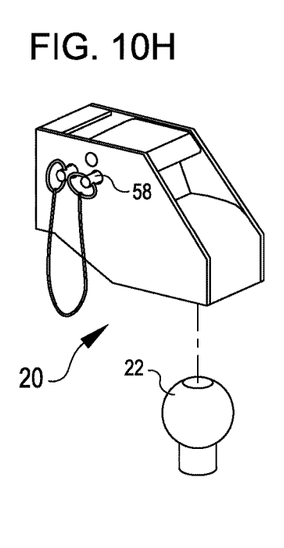
FIG. 10H shows an actuator coupler that is now positioned in storage configuration, unconnected to a ball hitch, with the safety pin inserted with the latch in a downward position, so the latch handle is now in a downlock position, securing the actuator coupler for storage.

In various embodiments, an actuator coupler 20 may include a number of components. First, a coupler case 25 is provided, which has a body 26, with a front 28 and a rear 30. As seen in FIG. 5, a ball hitch 22 receiver 32 is located within the body 26. The ball hitch 22 receiver 32 includes a downwardly oriented partially spherical surface portion 34 complementary in size to surface 35 selected ball hitch 22, for receiving a selected ball hitch 22 therein, as well as a front lip 36 which assists in securing the ball hitch 22 in the receiver 32. The body 26 also includes spaced apart first sidewall 40 and second sidewall 50, as well as rear spacer 44. The first 40 and second 50 sidewalls each have therein first (41, 51), second (42, 52), and third (43, 53) apertures, wherein each of the first (41, 51), second (42, 52), and third (43, 53) apertures are defined by first aperture sidewalls (41S, 51S) second aperture sidewalls (42S, 52S), and third aperture (43S, 53S) sidewalls, respectively. For use with a latch pivot shaft pin 56, the first 41 aperture in the first sidewall 40 is aligned with the first 51 aperture in the second sidewall 50. For use with a safety pin 58, the third 43 aperture in the first sidewall 40 is aligned with the third 53 aperture in the second sidewall 50.

As seen in FIGS. 5, 6, 7, and 8, within the body 26, a latch slot 60 is provided. The latch slot 60 is defined between a front wall 62 and a rear wall 64, and it also has an upper end wall 66.

Figure 2:
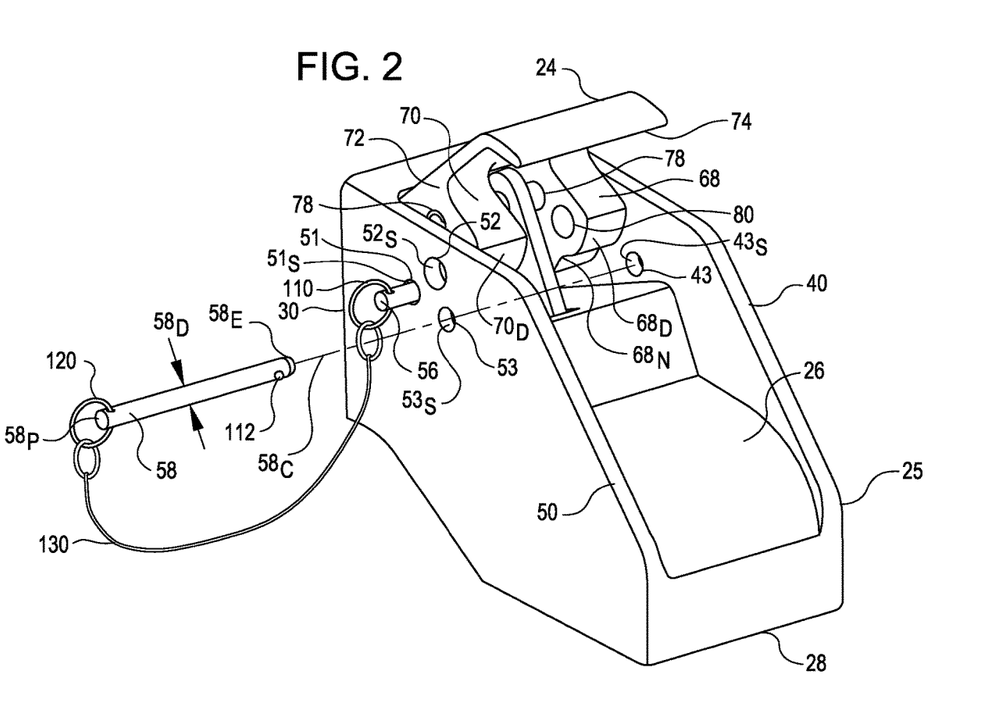
FIG. 2 is a perspective view of an embodiment for an actuator coupler for a ball hitch, similar to the view just provided in FIG. 1 above, but now showing the safety pin removed from the uplock position in the coupler case, so that the latch handle can be moved downward for closure, to secure a ball hitch therein.
Figures 4, 4A:
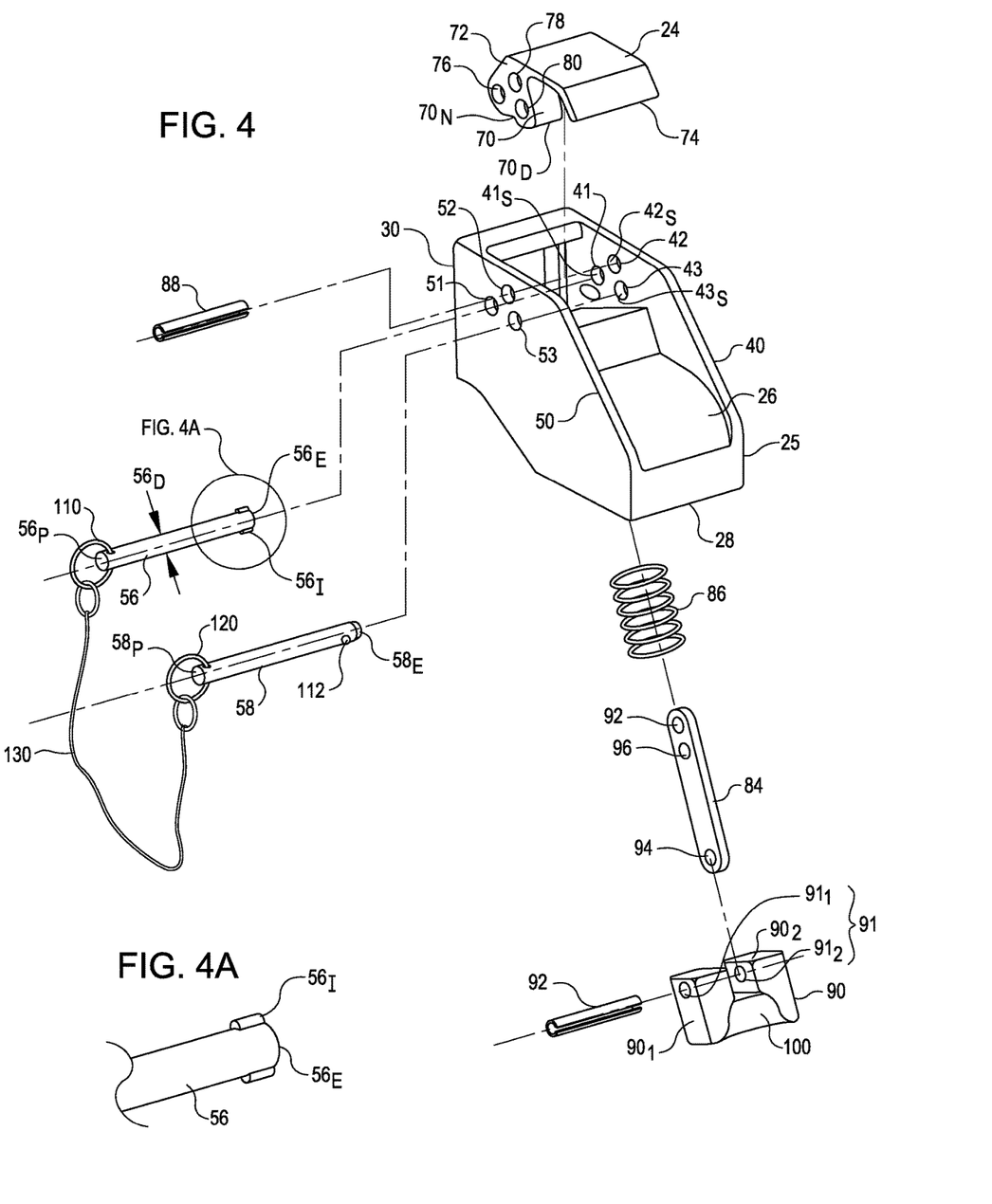
FIG. 4 is an exploded perspective view, showing the various components of the actuator coupler, including the coupler case, the latch handle, a latch pivot shaft pin, a safety pin, a safety wire connecting the latch pivot pin and the safety pin, a ball latch, a latch bar which connects the latch handle to the ball latch, a spring, an upper spring pin which engages the latch handle and the latch bar, and a lower spring pin which engages the latch bar and the ball latch.
FIG. 4A is an enlarged view of the distal end of the latch pivot shaft pin, showing use of raised interference features at the end which are sufficiently large to prevent escape through a first latch pivot pin aperture in the coupler case; the latch pivot pin may be installed by removal of the circular ring at the proximal end, moving the proximal end thought the first latch pivot pin aperture, then through the pivot pin aperture in the latch handle, and then through the second latch pivot pin aperture and finally, by reinstalling the circular ring at the proximal end of the latch pivot pin.

A latch handle 24 is provided. The latch handle 24 includes a base 72 and an actuator arm 74 which extends forward from the base 72. As seen in FIGS. 1 and 2, the base 72 may include a pair of ear portions 68 and 70 which are spaced apart in a generally downwardly directed U-shaped configuration, with a sufficient distance between ear portions 68 and 70 to allow free pivoting movement of a latch bar 84 therebetween. As seen in FIG. 4, the ear portions 68 and 70 of base 72 each have herein a plurality of transverse oriented apertures. The plurality of transverse oriented apertures include (a) latch pivot shaft pin receivers 76, (b) a spring pin receivers 78, and (c) safety pin receivers 80. As described in more detail below, due to construction details of the latch pivot shaft pin 56, the latch handle 24 is pivotably coupled to the coupler case 25 by inserting the latch pivot shaft pin 56 through the first aperture 41 in the first sidewall 40, then through the latch pivot pin receivers 76 in the ear portions 68 and 70 of base 72 of the latch handle 24, and then through the first aperture 51 in the second sidewall 50.

As best seen in FIG. 4, a latch assembly 82 is provided, including a latch bar 84, a spring 86, a spring pin 88, a ball latch 90, and a latch bar pin 92. The latch bar 84 is a thin, elongated plate used to connect the latch handle 24 to the ball latch 90. The latch bar 84 has therein a spring pin aperture 92, a latch bar pin aperture 94, and a safety pin aperture 96. The spring pin 88 is located at the spring pin receivers 78 in the base 72 of latch handle 24, and pivotally connects the latch bar 84 to the latch handle 24. In an embodiment, the spring pin 88 may be provided in the form of a bushing. In an embodiment, the bushing may provide an interference fit with the spring pin receivers 78 in the latch handle 24, while providing free movement between the spring pin 88 and the spring pin aperture 92 in the latch bar 84.

The ball latch 90 includes a latching surface 100 shaped for complementary fit against and engagement with a lower portion 102 of a selected ball hitch 22. A latch bar pin 92 pivotally secures the ball latch 90 to the latch bar 84. In an embodiment, the latch bar pin 92 may be provided as a bushing. In that case, the bushing provides an interference fit with the latch bar pin receivers 911 and 912 in the ball latch 90 while providing free movement between the latch bar pin 92 and the latch bar pin aperture 94 in the latch bar 84.

In an embodiment, the ball latch 90 may be provided in a generally U-shaped configuration having first 901 and second 902 prongs, wherein latch bar pin receiver 91 is provided as first 911 and second 912 latch bar pin receiver portions in the first 901 and second 902 prongs of the generally U-shaped ball latch 90. The spring 84 may be a compression coil type spring, which may be sized, shaped, and situated to surround at least a portion of the latch bar 84, within the latch slot 60 between the ball latch 90 and the upper end wall 66 of the latch slot 60, for urging the ball latch 90 downward and away from the upper end wall 66 of the latch slot 60.

As seen in FIG. 2, the latch pivot shaft pin 56 extends along a latch pivot shaft pin axis $56_C$ between a distal end $56E$ and a proximal end $56_P$, with an outside shaft diameter $56_D$ sized and shaped for insertion through the first apertures (41, 51) in each of the first 40 and second 50 sidewalls. In an embodiment, the latch pivot shaft pin 56 may be provided, at or near the distal end $56_E$, with an interference structure $56_I$ outwardly protruding for a distance larger than the outside shaft diameter $56_D$ sufficiently large that the interference structure $56_I$ cannot pass through the first aperture 41 in the first end wall 40. For installation, the latch pivot shaft pin 56 may be urged, proximal end $56_P$ first, through the first aperture 41 in the first end wall 40, then through the latch pivot shaft pin receivers 76, and then through the first aperture 51 in the second endwall 50, after which a first detachable ring 110 is affixed to the proximal end $56_P$, so as to securely keep the latch pivot shaft pin 56 in a working location. Thus, the first detachable ring 110 is sufficiently large to keep the first detachable ring 110 from passing through the first aperture 51 in the second sidewall 50.

Figure 3:
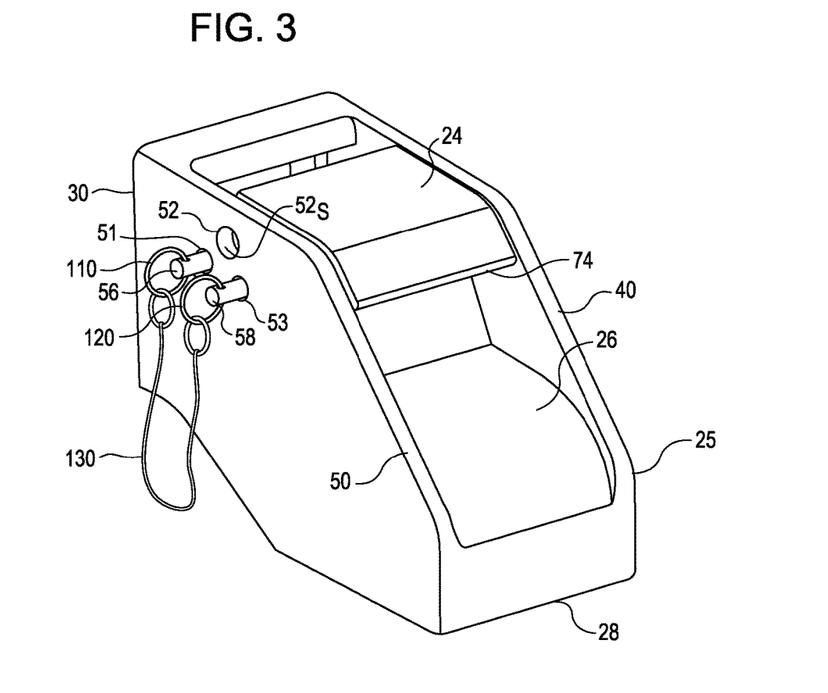
FIG. 3 is a perspective view of an embodiment for an actuator coupler for a ball hitch, similar to the views just provided in FIGS. 1 and 2 above, but now showing the safety pin inserted into the coupler case, and through an aperture in the latch handle, to secure latch handle in a downward, closed position, to secure a ball hitch therein.

A safety pin 58 is provided. The safety pin 58 may be provided in the shape of a cylindrical pin extending along a safety pin axis $58_C$ between a distal end $58_E$ and a proximal end $58_P$, and having an outside shaft diameter $58_D$ sized and shaped for insertion through the third apertures (43, 53) in each of the first 40 and second 50 sidewalls Adjacent to the distal end $58_E$ of the safety pin 58, a spring loaded ball detent 112 may be provided, wherein the spring loaded ball detent 112 is sized and shaped for interference resistance against passage of the safety pin 58 through the third aperture 53 in the first sidewall 50. When in a closed, downlock position, as illustrated in FIG. 3, the safety pin 58 is fitted though the safety pin aperture 96 in the latch bar 84, as well as through the safety pin receivers 80 in the base 72 of latch handle 24. And, when in a downlock position, the safety pin 58 is secured by the third apertures (43, 53) in first 40 and second 50 sidewalls, respectively. The safety pin 58 also includes a second detachable ring 120 affixed to the proximal end $58_P$, for ease of removal, as well as to provide a location for attachment of safety wire 130 between the first detachable ring 110 of latch pivot shaft pin 56 and the second detachable ring 120 of safety pin 58. The second detachable ring 120 is sufficiently large that the second detachable ring 124 cannot pass through the third aperture 53 in the second endwall 50. In any event, the safety wire 130 secures the safety pin 58 in proximity to the latch pivot shaft pin 56, to thereby avoid loss of the safety pin 58 during handling.

In an embodiment, the latch handle 28 is provided with a base 72 extending downward an ear shaped configuration with a pair of each shaped portions 68 and 70, each of which includes a downward facing surface $68_D$ and $70_D$, respectively. In an embodiment, the downward facing surfaces $68_D$ and $70_D$ may further include a safety pin receiving notch $68_N$ and $70_N$, respectively.

A novel feature described herein is the use of the safety pin 58 for securing the latch handle 24 in an uplock position, as illustrated in FIG. 1. In the uplock position, the safety pin 58 is inserted through the third apertures (43, 53) in each of the first 40 and second 50 sidewalls, and consequently any downward motion of the latch handle 24 about the latch pivot shaft pin 56 is arrested by the downward facing surfaces 68D and 70D of the ears 68 and 70 of the base 72 of the latch handle 24.

The actuator coupler 20 described herein needs no tools, or extra or loose parts, bolts, or other components for on-site operation for attachment or detachment of a ball hitch to the actuator coupler. Resultantly, the actuator coupler apparatus disclosed herein is easy to use, since all necessary components are already on board and readily available.

The device provides a significant improvement in safety during use, thus reducing the likelihood of injury during trailer connection or disconnection operations.

It is to be appreciated that the actuator coupler system described herein, which may be affixed to a trailer for towing a trailer behind a vehicle, as disclosed herein is an appreciable improvement in the art of actuator couplers for attaching ball hitches. Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the actuator coupler as described herein may be modified from those embodiments provided herein, without materially departing from the novel teachings and advantages provided.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A coupler for connecting a trailer to a ball hitch, comprising:
   (a) a coupler case, the coupler case comprising
      a body, the body having a front and a rear,
      spaced apart first and second sidewalls, the first and second sidewalls having therein first, second, and third apertures, each of the first, second, and third apertures defined by first aperture sidewalls, second aperture sidewalls, and third aperture sidewalls, respectively, and wherein the first, second and third apertures in the first sidewall are aligned with the first, second, and third apertures in the second sidewall,
      a ball hitch receiver, the ball hitch receiver located within the body, the ball hitch receiver having a downwardly oriented partially spherical surface portion complementary in size to a selected ball hitch, for receiving a selected ball hitch therein, a latch slot, the latch slot defined between a front wall and a rear wall, the latch slot further comprising an upper end wall;

(b) a latch pivot shaft pin;

(c) a latch handle, the latch handle having a base and an actuator arm extending forward from the base, the base having therein a plurality of transverse oriented apertures, the plurality of transverse oriented apertures including a latch pivot shaft pin receiver, a spring pin receiver, and a safety pin receiver, and wherein the latch handle is pivotably coupled to the coupler case by the latch pivot shaft pin;

(d) a latch assembly, the latch assembly comprising
a latch bar, the latch bar having therein a spring pin aperture, a latch bar pin aperture, and a safety pin aperture;
a spring,
a spring pin, the spring pin located at the spring pin receiver, and pivotally connecting the latch bar to the latch handle;
a ball latch, the ball latch shaped for complementary fit with a lower portion of a selected ball hitch;
a latch bar pin, the latch bar pin securing the ball latch to the latch bar;

(e) a safety pin, the safety pin extending along a safety pin axis between a distal end and a proximal end, and having an outside shaft diameter sized and shaped for insertion through the third apertures in each of the first and second sidewalls; and (f) wherein the proximal end of the safety pin further comprises a second detachable ring, and wherein the second detachable ring is sufficiently large that the second detachable ring cannot pass through the first aperture in the second end wall.

2. A coupler as set forth in claim 1, wherein the spring comprises a compression spring, and is sized and shaped to fit over the latch bar, and within the latch slot between the ball latch and the upper end wall of the latch slot, for urging the ball hitch downward and away from the upper end wall of the latch slot.

3. A coupler as set forth in claim 1, wherein the latch pivot shaft pin extends along a latch pivot shaft pin axis between a distal end and a proximal end, and having an outside shaft diameter sized and shaped for insertion through the first apertures in each of the first and second sidewalls.

4. A coupler as set forth in claim 3, wherein the distal end of the latch pivot shaft pin further comprises an interference structure outwardly protruding for a distance larger than the outside shaft diameter sufficiently large that the interference structure cannot pass through the first aperture in the first end wall.

5. A coupler as set forth in claim 3, wherein the proximal end of the latch pivot shaft pin further comprises a first detachable ring, and wherein the first detachable ring is sufficiently large that the first detachable ring cannot pass through the first aperture in the second sidewall.

6. A coupler as set forth in claim 5, further comprising a safety wire, the safety wire secured at the first detachable ring and at the second detachable ring, to secure the safety pin in proximity to the latch pivot shaft pin, and thereby avoid loss of the safety pin.

7. A coupler as set forth in claim 1, further comprising, adjacent the distal end of the safety pin, a spring loaded ball detent, the spring loaded ball detent sized and shaped for interference resistance against passage of the safety pin through the third aperture in the first sidewall.

8. A coupler as set forth in claim 1,
(a) wherein the base of the latch handle extends downward in an ear shaped configuration having a downward facing surface; and
(b) wherein when the safety pin is inserted through the third apertures in each of the first and second sidewalls, downward motion of the latch handle about the latch pivot shaft pin is arrested by the downward facing surface.

9. A coupler as set forth in claim 8, wherein the downward facing surface, further comprises a safety pin receiving notch, and wherein the safety pin receiving notch rests on the safety pin when the latch handle is in an upward, open, hitch release position, so as to prevent downward motion of the latch handle.

10. A coupler as set forth in claim 1, wherein the safety pin aperture in the latch bar is sized for passage of the safety pin therethrough, so that when the latch handle is in a downward, ball hitch securing position, the safety pin is inserted through the third apertures in each of the first and second sidewalls, and through the safety pin aperture in the latch bar, and when so inserted, thereby secures the latch handle in a downward, locked position.

11. The coupler as set forth in claim 1, wherein the spring comprises a coil spring.

12. The coupler as set forth in claim 1, wherein the spring pin comprises a bushing, the bushing providing an interference fit with the spring pin receiver in the latch handle, while providing free movement between the spring pin and the spring pin aperture in the latch bar.

13. The coupler as set forth in claim 1, wherein the latch bar pin comprises a bushing, the bushing providing an interference fit with the latch bar pin receiver in the ball latch, while providing free movement between the latch bar pin and the latch bar pin aperture in the latch bar.

14. The coupler as set forth in claim 1, wherein the ball latch has a generally U-shaped configuration having first and second prongs, wherein latch bar pin receiver comprises latch bar pin receiving portion in each of the first and second prongs of the generally U-shaped ball latch.

15. A coupler for connecting a trailer to a ball hitch, comprising:
(a) a coupler case, the coupler case comprising
a body, the body having a front and a rear,
spaced apart first and second sidewalls, the first and second sidewalls having therein first, second, and third apertures, each of the first, second, and third apertures defined by first aperture sidewalls, second aperture sidewalls, and third aperture sidewalk, respectively, and wherein the first, second and third apertures in the first sidewall are aligned with the first, second, and third apertures in the second sidewall,
a ball hitch receiver, the ball hitch receiver located within the body, the ball hitch receiver having a downwardly oriented partially spherical surface portion complementary in size to a selected ball hitch, for receiving a selected ball hitch therein,
a latch slot, the latch slot defined between a front wall and a rear wall, the latch slot further comprising an upper end wall;
(b) a latch pivot shaft pin;
(c) a latch handle, the latch handle having a base and an actuator arm extending forward from the base, the base further comprising a pair of downwardly oriented ear portions that are spaced apart to form a slot therebetween, the base having therein a plurality of transverse oriented apertures, the plurality of transverse oriented apertures including a latch pivot shaft, pin receiver, a spring pin receiver, and a safety pin receiver, and wherein the latch handle is pivotably coupled to the coupler case by the latch pivot shaft pin;

(d) a latch assembly, the latch assembly comprising
- a latch bar, the latch bar having therein a spring pin aperture, a latch bar pin aperture, and a safety pin aperture, wherein a latch bar portion adjacent the spring pin aperture is located in the slot between the ear portions of the latch handle base;
- a spring,
- a spring pin, the spring pin pivotally connecting the latch bar to the latch handle;
- a ball latch, the ball latch shaped for complementary fit with a lower portion of a selected ball hitch; and
- a latch bar pin, the latch bar pin securing the ball latch to the latch bar.

16. A coupler as set forth in claim 15,
(a) wherein the ear portions of the latch handle base each have a downward facing surface,
(b) further comprising a safety pin, the safety pin extending along a safety pin axis between a distal end and a proximal end, and having an outside shaft diameter sized and shaped for insertion through the third apertures in each of the first and second sidewalls; and
(c) wherein when the safety pin is inserted through the third apertures in each of the first and second sidewalls, downward motion of the latch handle about the latch pivot shaft pin is arrested by the downward facing surface.

17. A coupler as set forth in claim 16, wherein each of the downward facing surfaces further comprise a safety pin receiving notch, and wherein the safety pin receiving notch rests on the safety pin when the latch handle is in an upward, open, hitch release position, so as to prevent downward motion of the latch handle.

18. A coupler as set forth in claim 15,
(a) further comprising a safety pin, the safety pin extending along a safety pin axis between a distal end and a proximal end, and having an outside shaft diameter sized and shaped to insertion through the third apertures in each of the first and second sidewalls; and
(b) wherein the safety pin aperture in the latch bar is sized for passage of the safety pin therethrough, so that when the latch handle is in a downward, ball hitch securing position, the safety pin is inserted through the third apertures in each of the first and second sidewalls, and through the safety pin aperture in the latch bar, and when so inserted, thereby secures the latch handle in a downward, locked position.

* * * * *